Dec. 29, 1953    M. V. DADD ET AL    2,664,076
EXHAUST VALVE ROTATOR
Filed April 12, 1952
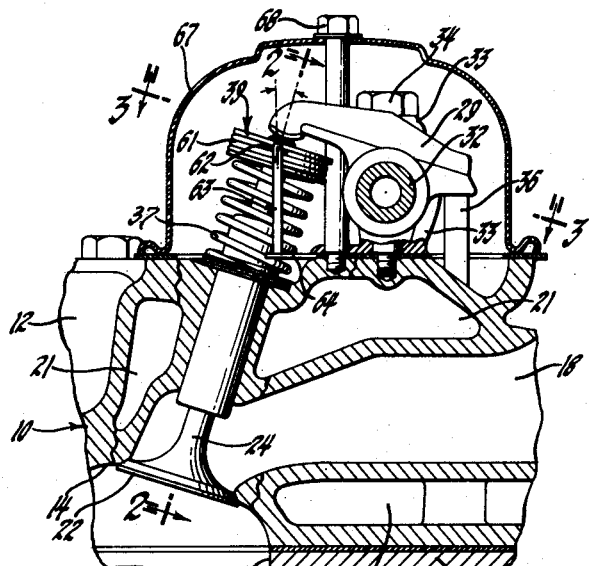
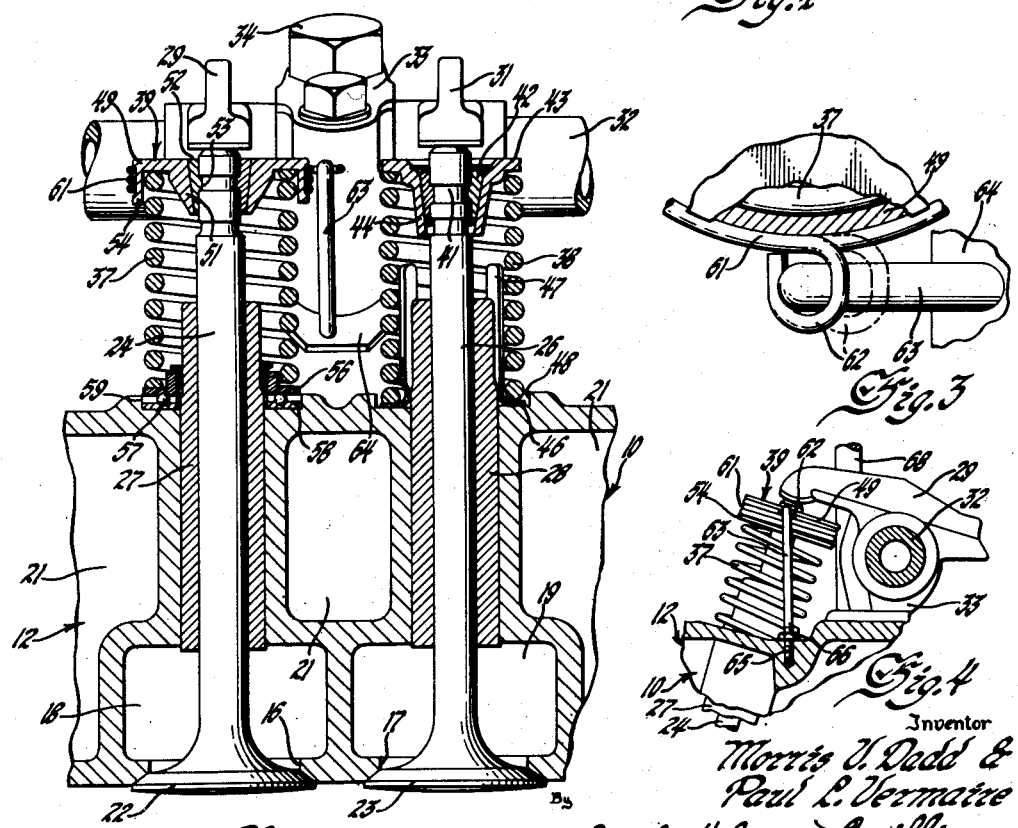

Patented Dec. 29, 1953

2,664,076

UNITED STATES PATENT OFFICE 2,664,076

EXHAUST VALVE ROTATOR

Morris V. Dadd and Paul L. Vermaire, Grand Rapids, Mich., assignors to General Motors Corporation, Detroit, Mich., a corporation of Delaware Application April 12, 1952, Serial No. 282,042

7 Claims. (Cl. 123—90)

This invention relates to valve rotating devices for engines. An object of the invention is to provide a one-way clutch device which can be employed on standard engine valves and which can be rotated in one direction by a cam device which also can be applied to standard engines. More specifically, it is proposed to make the spring cap or washer for a valve in such a way that a cylindrical drum will be provided. The drum is adapted to be frictionally engaged by a clutch spring, one end of which acts as a follower for a cam member mounted on the engine in oblique relation to the axis of movement of the valve. When the valve is opened and closed the cam member will expand and contract the spring clutch for the purpose of rotating the drum and the valve to which it is attached as the valve is opened and closed.

In the drawings:

Figure 1 is a fragmentary transverse sectional view through an engine having poppet type valves adapted to be rotated by mechanism embracing the principles of the invention.

Figure 2 is an enlarged longitudinal sectional view of a part of the structure disclosed by Figure 1. Figure 2 is taken substantially in a plane through the axes of the valves employed in the structure illustrated by Figure 1 and on line 2—2 of Figure 1 looking in the direction of the arrows thereon.

Figure 3 has an enlarged fragment of the structure disclosed by Figure 1 taken substantially in the plane of line 3—3 of Figure 1. Figure 3 particularly illustrates the follower end of the clutch spring employed in the rotating device illustrated by Figure 1 and the cam member employed in operating the clutch spring.

Figure 4 is a fragmentary view illustrating a modified support for the camming device embraced in the structure shown by the preceding figures.

The engine 10 illustrated by the drawing comprises a block 11 and a head 12 in which a cylinder 13 is formed. The cylinder 13 is adapted to receive the piston for operating the crank by which the power developed by the engine is delivered. The block 11 and the head 12 comprise a wall 14 forming the cylinder 13 and through which exhaust and inlet ports 16 and 17 respectively are formed. The wall 14 is formed in such a way as to provide exhaust and inlet passages 18 and 19 respectively for the purpose of exhausting the cylinder 13 through exhaust port 16 and supplying thereto an explosive charge through port 17. The wall 14 is also formed in such a way as to provide cooling cavities 21 for supplying liquid to the engine for cooling the engine.

The ports 16 and 17 are adapted to be opened and closed with respect to the cylinder 13 by valves indicated at 22 and 23. The valves 22 and 23 have valve stems 24 and 26 adapted to project through openings formed in the wall 14 and to be supported therein in valve stem bearing sleeves indicated at 27 and 28. The valves 22 and 23 may be opened in time relation to one another by rocker arms indicated at 29 and 31 which are mounted for oscillating movement upon a rocker shaft indicated at 32. The rocker shaft 32 may be supported throughout its length upon spaced rocker bearing blocks or pedestals indicated at 33. These may be secured to the head 12 by bolts 34 which extend through the blocks or pedestals 33 and into threaded openings formed in the head 12. The rocker arms 29 and 31 are adapted to be pivotally actuated upon rocker shaft 32 by camshaft driven push rods indicated at 36. The valves 22 and 23 may be closed in any suitable manner as by the use of springs indicated at 37 and 38.

Either or both of the valves 22 and 23 may be intermittently rotated during the opening or closing movement thereof by valve rotating devices indicated generally at 39.

In the present instance the inlet valve 23 is of standard construction and is not provided with a valve rotating device such as that indicated at 39. In order to confine the spring 38, the stem 26 of the valve 23 is provided with a groove indicated at 41 for longitudinally securing on the end of the stem 26 a pair of tapered clamping blocks or segments indicated at 42. The blocks or segments 42 are held together by a spring washer or member 43 having an inwardly disposed and tapering sleeve 44 in which the segments 42 are adapted to be confined. The washer 43 supports one end of the valve closing spring 38, while the opposite end of spring 38 engages the flanged end 46 of a spring damping device 47. The flanged end 46 is adapted to be received in a groove 48 formed in the upper surface of the head 12 around the bearing sleeve 28.

In the present instance the spring 37 forms a part of the valve rotating device 39 although it will be apparent that the valve rotating device is capable of being constructed independently of spring 37.

In the structure illustrated, the rotating device 39 comprises a drum, washer, cap or member 49 formed in such a way as to provide an inner peripheral sleeve 51 having a tapering inner surface adapted to engage clamping blocks or segments 52 clamped by the sleeve 51 upon the end of the valve stem 24 of the valve 22. The blocks 52 at the end of the stem 24 are formed in such a way as to provide a complementary channel and shoulder structure indicated at 53 and adapted to prevent the blocks 52 from being displaced longitudinally with respect to the axis of the stem 24. The outer periphery of the drum 49 is formed in such a way as to provide a laterally projecting flange 54 which extends inwardly with respect to the valve stem 24 for receiving and confining one end of the spring 37. The opposite end of the spring 37 seats upon the movable race 56 of a ball thrust bearing 57. The race 58 of the ball bearing 57 seats in a groove 59 formed in the upper surface of the head 12 and around the bearing sleeve 27 which projects therethrough. It will be apparent from the structure described that the spring 37 can rotate upon the thrust bearing 57 with the drum or washer 49.

The outer surface of the flange 54 of the drum 49 is formed in such a way as to provide a cylindrical surface which is concentric with respect to the axis of the stem 24 of the valve 22. This cylindrical surface is adapted to receive and to be frictionally engaged by the convolutions of a spring clutch member indicated at 61. One end of the spring clutch member 61 is formed in such a way as to provide an eye or follower indicated at 62. The eye or follower 62 is adapted to receive a cam member 63 in the form of a pin and the exterior surface of which provides a cam surface adapted to be disposed in oblique relation to the axis of the valve 22. The cam member, or pin 63, may be supported upon the engine 10 in any suitable manner as by the employment of a bracket or plate 64 to which the end of the cam member 63 opposite the follower 62 is rigidly secured. The bracket or plate 64 may be secured rigidly to the head 12 beneath the rocker shaft bearing pedestal indicated at 33.

In the modification illustrated by Figure 4 the pin 63 is screw threaded at the end thereof opposite the follower 62 and is secured in a threaded opening 65 formed in the upper surface of the head 12. A lock nut 66 may be employed on the pin 63 for the purpose of locking the pin with respect to the threaded opening 65.

The entire valve actuating structure may be closed by a suitable cover indicated at 67 which may be secured to the head 12 by bolts indicated at 68.

It will be apparent that the reciprocating movement of the valve 22 upon the axis of the stem 24 will cause the eye or follower 62 to follow the cam surface formed byt he exterior surface of the cam member or pin 63. Since the surface formed on the pin or follower member 63 is disposed in oblique relation to the axis of the valve 22, it will be apparent that the follower 62 will tend to move the eye or follower end of the spring 61 in opposite directions circumferentially with respect to the cylindrical surface of the drum 49, as the valve 22 opens and closes. The different limits of movement of the follower end of the spring 61 are shown in full lines and in dot and dash lines in Figure 3. The spring 61 may be wound upon the cylindrical surface of the drum 49 in such manner as to cause rotation of the valve 22 in either direction but as shown in Figure 1 the spring 61 is wound upon the drum 49 in such manner as to rotate the valve 22 during the opening movement of the valve 22. When the rocker arm 29 depresses the valve stem 24, the eye or follower 62 will follow the surface of the pin 63 in a way which will tend to contract the spring 61 upon the cylindrical surface of the drum 49. When the spring is contracted upon drum 49 and the eye end thereof is moved circumferentially by the cam surface of the pin 63, it will be apparent that the drum 49 will be rotated to an increasing extent as the valve 22 opens. Since such movement of the follower end 62 of the spring 61 contracts the spring upon the drum 49 it will be apparent that opening movement of the valve 22 will rotate the drum when the valve 22 is opened. Since the drum 49 is secured rigidly to the stem 24 of the valve 22 the rotation of the drum 49 will rotate the valve 22 in one direction upon opening movement of the valve 22.

As the valve 22 closes, the camming surface of the pin 62 will move the follower end 62 of the spring 61 in the opposite direction. However, since movement of the end 62 of the spring 61 in the opposite direction will tend to expand the spring 61 upon the drum 49, the frictional force will be relieved between the spring 61 and the cylindrical exterior surface of the drum 49. It will be apparent that the static friction which might otherwise cause the drum to rotate with the spring 61 before releasing the spring 61 from the drum 49 will be overcome by the inertia of the drum 49, the valve 22 and the spring 37 since these elements have a much greater mass than that required to overcome the static frictional force exerted by the spring.

We claim:

1. A valve rotating device comprising a cylindrical drum to be secured to a valve and to be reciprocated with said valve during the operation of the valve, a helical spring mounted upon said drum and having convolutions engaging the surface of said drum, and fixed cam means engaging one end of said spring for alternately expanding and contracting said spring convolutions in response to the reciprocating movement of said valve.

2. A valve rotating device to be mounted upon a reciprocating valve stem and having a cylindrical drum in concentric relation to the axis of said valve, a helical spring mounted upon the cylindrical surface of said drum with the convolutions thereof in frictional engagement with said surface, and fixed cam means for moving one end of said spring alternately in opposite directions about said axis in response to reciprocation of the valves.

3. A valve rotating device comprising a cap having a cylindrical surface formed thereon and being adapted to be secured to a reciprocating valve with said cylindrical surface in concentric relation to the axis of movement of said valve, spring clutch means frictionally engaging said cylindrical surface and being contracted upon said surface for rotating said valve in one direction when one end of said spring is circumferentially moved in one direction and being expanded upon said surface for releasing said cap when said end of said spring is moved in the opposite direction, and fixed means responsive to the reciprocating movement of said valve for circumferentially moving said end of said spring in opposite directions.

4. A valve rotating device for engines having a cylinder wall having a port formed therein and having a valve to close and open said port, said valve rotating device comprising a drum to be mounted on the stem of said valve and having a cylindrical surface formed thereon, a clutch spring mounted on said drum, and a cam member adapted to be secured to said cylinder wall, said cam member having a cam surface for engagement by said spring during the reciprocating movement of said valve, said cam surface being formed to extend obliquely with respect to the axis of movement of said valve.

5. A valve rotating device for engines having a cylinder wall provided with a port adapted to be opened and closed by a valve having a stem, said valve rotating device comprising a drum having a cylindrical surface formed thereon concentric with the stem of said valve, a clutch spring mounted on said cylindrical surface for bodily reciprocation therewith, an end formed on said clutch spring to expand and contract said clutch spring out of and into rotative frictional driving engagement with said cylindrical surface upon movement of said end in respective opposite directions circumferentially of said drum, said end of said spring being adapted for slidable engagement with an obliquely disposed cam surface on said engine wall arranged to produce said movement when said valve is reciprocated for opening and closing said port.

6. A valve rotating device for engines having a cylinder wall formed to provide a port to be opened and closed by a valve having a stem, said valve rotating device comprising a drum adapted to be mounted on the stem of said valve and having a cylindrical surface disposed concentrically with respect to the axis of said valve, a spring clutch frictionally engaging said cylindrical surface and having an end projecting outwardly therefrom, a bracket adapted to be mounted upon said engine and having a cam surface formed thereon which is disposed obliquely with respect to the axis of said valve, said clutch spring being adapted to be positioned with respect to said bracket so that said end follows said cam surface during the reciprocating movement of said valve.

7. A valve mechanism comprising a valve member adapted to open and close a port formed in a wall, a washer mounted upon said valve member and having a cylindrical flange projecting from the peripheral edge thereof, said flange having a surface formed thereon in concentric relation to the axis of said valve, a thrust bearing disposed about said valve and being adapted to be supported by said wall, a spring surrounding said valve and having the opposite ends thereof supported by said thrust bearing and a part of said washer within said flange, a clutch spring frictionally mounted on the cylindrical surface of said flange, and the cam member adapted to be mounted on said wall and having a cam surface disposed obliquely with respect to the axis of said valve, said cam member being movably related to cam follower means formed on said clutch spring for operating said clutch spring upon the reciprocating movement of said valve.

MORRIS V. DADD.
PAUL L. VERMAIRE.

References Cited in the file of this patent

UNITED STATES PATENTS

| Number | Name | Date |
|---|---|---|
| 2,589,418 | Mitzelfeld et al. | Mar. 18, 1952 |
| 2,590,719 | MacPherson | Mar. 25, 1952 |